Aug. 14, 1923.
M. A. SHINSKIE
SAFETY LOGGING HOOK
Filed Dec. 18, 1922
1,464,665
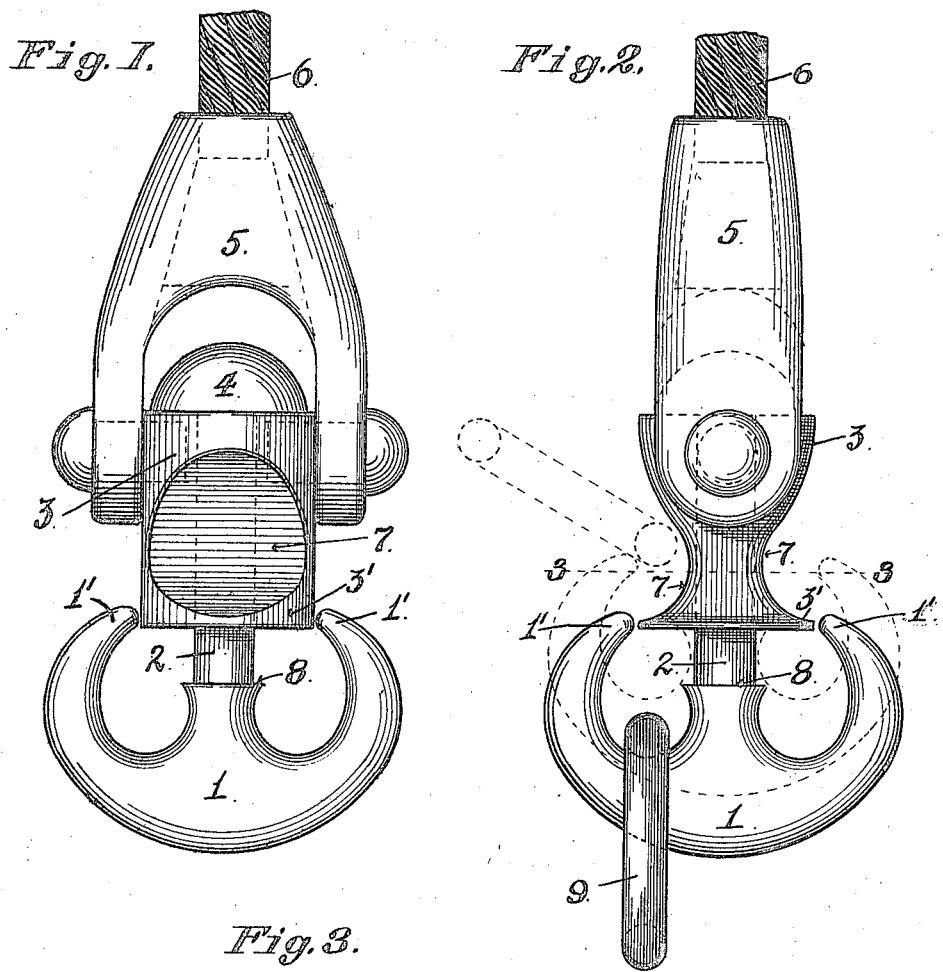
Inventor.
Marcus A. Shinskie
By Booth & Booth
Attorneys Patented Aug. 14, 1923.

1,464,665

UNITED STATES PATENT OFFICE.

MARCUS A. SHINSKIE, OF USONA, CALIFORNIA.

SAFETY LOGGING HOOK.

Application filed December 18, 1922. Serial No. 607,566.

*To all whom it may concern:*

Be it known that I, MARCUS A. SHINSKIE, a citizen of the United States, residing at Usona, in the county of Mariposa and State of California, have invented certain new and useful Improvements in Safety Logging Hooks, of which the following is a specification.

My invention relates to the general class of safety hooks, and particularly to logging hooks which are connected with the tugs of the main line leading to the donkey engine drums, and are adapted for ready connection with the chokers fitted to the log.

It is essential that the connection between the hook and the choker be as safe as possible, and for this purpose a guard member is associated with the hook, which is capable of such adjustment as to provide for the ready entrance of the ring or link of the choker to the hook and its subsequent intentional release therefrom, while during the hauling tension it practically closes said entrance and avoids any accidental or premature disengagement.

The object of my invention is to provide a simple and effective hook of this type, and to this end my invention consists in the novel safety hook which I shall hereinafter fully describe by reference to the accompanying drawings, in which—

Fig. 1 is a front elevation of my hook showing the position of the guard member when closing the hook entrance under the tension of hauling.

Fig. 2 is a side elevation of the same, showing the guard member in a position at right angles to that shown in Fig. 1, the hook member remaining in the same position, and still guarded, the dotted lines showing a relative change in the position of the two members, adapting the device for the engagement and release of the chokers.

Fig. 3 is a section of the guard member on the line 3—3 of Fig. 2.

The hook member 1, which in its best form is a double hook, with two opposing prongs 1', has a shank 2, in the line of its axis, which shank is both rotatable and slidable in a trunnion block 3, which constitutes the guard member. A head 4 on the shank takes the strain on the hook 1.

The trunnion block or guard member 3 is pivotally mounted in the yoke 5 to which the tug cable 6 is suitably secured.

The guard member 3 is a cylindrical block, but has a pair of depressions 7, in opposite sides, the end of the block, indicated by 3' remaining cylindrical, and of a diameter slightly less than the distance between the points of the prongs. The sliding movement of the hook shank 2 in the guard block 3 is limited outwardly by the head 4 of the shank, and inwardly by a shoulder 8 on the hub of the hook.

9 in Fig. 2 indicates a link or ring of one of the chokers applied to the hook.

It will now be seen that when the hook member 1 is pushed inwardly towards the block 3, until limited by the shoulder 8, the prongs 1' of the hook pass by the adjacent cylindrical end 3' of the block, and then by rotating the hook relatively to the block, its prongs will lie opposite the depressions 7 in the block, as shown by the dotted lines in Fig. 1. In this position ample clearance between the prongs and the block is afforded to permit the entrance of the choker rings to the hook and their subsequent intentional removal therefrom, as shown by the dotted lines in Fig. 2. Then if the hook be rotated partially to bring the extremities of its prongs opposite the full position of the block circumference, the entrance to the hook is temporarily closed, and when strain is placed on the hook, it is pulled out again in the block to the limit of the shank head 4, and the extremities of the prongs lie opposite and in close relation to the full cylindrical guard end 3' of the block, which thus permanently closes the hook, no matter what rotative position said hook may assume.

By reason of the trunnions of the guard block 3 and the rotative movement of the hook 1, the latter is adapted for universal swiveling.

I claim:

1. A safety hook comprising a hook member having a prong and a shank; and a cylindrical guard member in which said shank is mounted for rotative and sliding movement adapting the hook prong to closely overlie the periphery of the guard member, said guard member having in its side a depression to increase the space between the hook prong and the guard member when said prong lies opposite said depression.

2. A safety hook comprising a hook member having a prong and a shank; a cylindrical guard member in which said shank is mounted for rotative and sliding movement adapting the hook prong to closely overlie the periphery of the guard member, said guard member having in its side a depression to increase the space between the hook prong and the guard member when said prong lies opposite said depression; and a yoke member in which said guard member is pivotally mounted.

3. A safety hook comprising a hook member having oppositely disposed prongs, and an axially disposed shank; and a cylindrical guard member in which the hook shank is mounted for both rotative and sliding movement adapting the hook prongs to closely overlie the periphery of the guard member, said guard member having a pair of opposing depressions in its sides to increase the space between the hook prongs and the guard member when said prongs lie opposite said depressions.

4. A safety hook comprising a hook member having oppositely disposed prongs, and an axially disposed shank; a cylindrical guard member in which the hook shank is mounted for both rotative and sliding movement adapting the hook prongs to closely overlie the periphery of the guard member, said guard member having a pair of opposing depressions in its sides to increase the space between the hook prongs and the guard member when said prongs lie opposite said depressions; and a yoke member in which said guard member is pivotally mounted.

In testimony whereof I have signed my name to this specification.

MARCUS A. SHINSKIE.